(12) United States Patent
Shibata et al.

(10) Patent No.: US 6,995,956 B2
(45) Date of Patent: Feb. 7, 2006

(54) ROTARY HEAD HAVING AN ADJUSTABLE MAGNETIC HEAD AND A MAGNETIC RECORDING/REPRODUCING APPARATUS

(75) Inventors: Makoto Shibata, Tokyo (JP); Masahiro Miyazaki, Tokyo (JP); Kazuhiko Maejima, Tokyo (JP)

(73) Assignee: TDK Corporation, Tokyo (JP)

( * ) Notice: Subject to any disclaimer, the term of this patent is extended or adjusted under 35 U.S.C. 154(b) by 126 days.

(21) Appl. No.: 10/369,615

(22) Filed: Feb. 21, 2003

(65) Prior Publication Data

US 2003/0161076 A1    Aug. 28, 2003

(30) Foreign Application Priority Data

Feb. 28, 2002 (JP) .............................. 2002-054126
May 22, 2002 (JP) .............................. 2002-148115

(51) Int. Cl.
*G11B 5/56* (2006.01)
(52) U.S. Cl. .................................................. 360/291.6
(58) Field of Classification Search .............. 360/291.6
See application file for complete search history.

(56) References Cited

U.S. PATENT DOCUMENTS 3,775,567 A  * 11/1973 Bruck ..................... 360/291.6
6,411,473 B1    6/2002 Ozue et al.

FOREIGN PATENT DOCUMENTS

| JP | A 63-293716 | 11/1988 |
| JP | A 1-220117  | 9/1989  |
| JP | A 2-273313  | 11/1990 |
| JP | A 3-46114   | 2/1991  |
| JP | A-8-63841   | 3/1996  |
| JP | A 11-259834 | 9/1999  |
| JP | A 2002-74629 | 3/2002 |

* cited by examiner

*Primary Examiner*—A. J. Heinz
(74) *Attorney, Agent, or Firm*—Oliff & Berridge, PLC

(57) ABSTRACT

The present invention provides a rotary head comprising a tubular rotary cylinder; and a magnetic head for carrying out at least one of recording and reading of information with respect to a magnetic tape transported about the rotary cylinder; wherein the magnetic head is supported so as to be movable toward the outside of the rotary cylinder.

9 Claims, 16 Drawing Sheets

ROTARY HEAD HAVING AN ADJUSTABLE MAGNETIC HEAD AND A MAGNETIC RECORDING/REPRODUCING APPARATUS

BACKGROUND OF THE INVENTION

1. Field of the Invention

The present invention relates to a rotary head used for recording or reproducing information on a magnetic tape, and a magnetic recording/reproducing apparatus equipped therewith.

2. Related Background Art

Magnetic recording/reproducing apparatus such as data storages, audio decks, video decks, and video cameras, which use magnetic tapes as their recording media, employ rotary heads adapted to helical scanning in order to achieve a higher recording density. Such a rotary head has conventionally utilized an inductive magnetic head employable for both recording and reading information on a magnetic head, or a magnetoresistive head (hereinafter also referred to as "MR head") which can read out information with a sensitivity higher than that of the inductive magnetic head.

In the inductive magnetic head, the magnetic tape is transported so as to slide over the magnetic head in order to prevent foreign matters from attaching to the sliding surface between the tape and head and thereby deteriorating recording and reproducing performances. The friction upon sliding wears the magnetic head surface to some extent, whereby a surface without foreign matters is always exposed.

SUMMARY OF THE INVENTION

However, the following problems may exist in the above-mentioned conventional technique. Namely, while the conventional rotary head transports the magnetic tape so as to make it slide over the inductive magnetic head in order to eliminate foreign matters as mentioned above, the magnetic head may break due to unintentional forces received from the magnetic tape or the electrostatic discharge (ESD) or thermal asperity (TA) occurring upon contact with the magnetic tape or wear due to the frictional force accompanying the sliding if the magnetic tape is brought into too much contact with the magnetic head. If the distance between the magnetic tape and magnetic head is too long, on the other hand, the magnetic head may fluctuate its output or lower its reproduction sensitivity.

An example of rotary heads using an MR head is described in Japanese Patent Application Laid-Open No. HEI 11-259834. While the above-mentioned publication discloses a technique for restraining the MR head from wearing, there remains plenty of scope for improvement.

It is an object of the present invention to provide a rotary head which can appropriately adjust the contact state between a magnetic head and a magnetic tape, and a magnetic recording/reproducing apparatus equipped therewith.

The present invention provides a rotary head comprising a tubular rotary cylinder; and a magnetic head for carrying out at least one of recording and reading of information with respect to a magnetic tape transported about the rotary cylinder; wherein the magnetic head is supported so as to be movable toward the outside of the rotary cylinder.

Since the magnetic head is supported so as to be movable toward the outside of the rotary cylinder, the rotary head in accordance with this aspect of the present invention can appropriately adjust the contact state between the magnetic head and magnetic tape.

Preferably, the magnetic head is swingably supported by an arm disposed within the rotary cylinder. Providing an arm swingably supporting the magnetic head as such can easily move the magnetic head toward the outside of the rotary cylinder.

Preferably, the magnetic head is disposed on one end side of the arm, and moves to the outside of the rotary cylinder when an airflow caused by a rotation of the rotary cylinder acts on the other end side of the arm. When an airflow is generated by a rotation of the rotary cylinder in such a configuration, the magnetic head moves toward the outside of the rotary cylinder due to the airflow. As a consequence, a configuration which can move the magnetic head toward the outside of the rotary cylinder can be realized simply at a low cost.

Preferably, the rotary cylinder is provided with an opening, disposed at a position ahead of the magnetic head in the rotating direction of the rotary cylinder, for introducing the airflow therein. In such a configuration, the airflow generated by the rotation of the rotary cylinder can reliably be introduced into the rotary cylinder, so as to act on the other end side of the arm.

The present invention provides a rotary head comprising a tubular rotary cylinder; a magnetic head for carrying out at least one of recording and reading of information with respect to a magnetic tape transported about the rotary cylinder; and gap adjusting means for adjusting a gap between the magnetic head and magnetic tape by using an airflow generated between the magnetic head and magnetic tape.

Since the gap adjusting means adjusts the gap between the magnetic head and magnetic tape, the rotary head in accordance with this aspect of the present invention can appropriately regulate the contact state between the magnetic head and magnetic tape.

Preferably, the gap adjusting means includes a groove formed in a support for attaching the magnetic head thereto at a surface opposed to the magnetic tape, and generates a positive pressure between the magnetic tape and the surface opposed to the magnetic tape. Such a configuration can regulate the contact state between the magnetic head and magnetic tape in a direction in which the magnetic tape moves away from the magnetic head.

Preferably, the gap adjusting means includes a groove formed in a support for attaching the magnetic head thereto at a surface opposed to the magnetic tape, and generates a negative pressure between the magnetic tape and the surface opposed to the magnetic tape. Such a configuration can regulate the contact state between the magnetic head and magnetic tape in a direction in which the magnetic tape approaches the magnetic head.

Preferably, in each of the above-mentioned rotary heads, the magnetic head includes a magnetoresistive device for reading information of the magnetic tape by using a magnetoresistive effect. A magnetic head utilizing a magnetoresistive device is advantageous in that its sensitivity is higher than that of an inductive magnetic head. However, like the inductive magnetic head, it will be unfavorable if the surface of the magnetic head utilizing the magnetoresistive device is worn by friction with the magnetic tape. In particular, when the magnetoresistive device is worn, the depth (so-called MR height) of the device from its surface opposed to the magnetic tape changes, thereby altering a characteristic of the magnetic head. When the magnetic head and magnetic tape are separated from each other, on the other hand, the output sensitivity may decrease greatly, thereby deteriorating the output characteristic. Therefore, as mentioned above, the magnetic head is made movable toward the outside of the rotary cylinder, or the gap between the magnetic head and magnetic tape is made adjustable by the airflow generated between the magnetic head and magnetic tape, so as to regulate the contact state between the magnetic head and magnetic tape appropriately, whereby the magnetoresistive device can be prevented from receiving too much shock from or friction with the magnetic tape, and the magnetic head can be kept from deteriorating its output characteristic.

Preferably, the magnetic head is an inductive magnetic head. Though the inductive magnetic head is supposed to have a surface to be worn by friction with a magnetic tape in general in such a configuration, the magnetic head is made movable toward the outside of the rotary cylinder, or the gap between the magnetic head and magnetic tape is made adjustable by the airflow generated between the magnetic head and magnetic tape, so as to regulate the contact state between the magnetic head and magnetic tape, whereby the magnetic head can be prevented from receiving too much shock from or friction with the magnetic tape and can be kept from deteriorating its output characteristic.

In another aspect, the present invention provides a rotary head comprising a tubular rotary cylinder; and a magnetic head for carrying out at least one of recording and reading of information with respect to a magnetic tape transported about the rotary cylinder; wherein the magnetic head is supported so as to be movable toward the inside of the rotary cylinder.

Even when a force directed to the rotary cylinder is applied to the magnetic tape in the rotary head in accordance with this aspect of the present invention, the magnetic head is moved toward the inside of the rotary cylinder, i.e., away from the magnetic tape, whereby the contact state between the magnetic head and magnetic tape can be adjusted appropriately. As a consequence, the magnetic head can be prevented from receiving too much shock from or friction with the magnetic tape.

The rotary head in accordance with this aspect of the present invention may be configured such that the magnetic head is moved toward the inside of the rotary cylinder due to a pressure from the magnetic tape.

When the magnetic head receives too much shock from the magnetic tape in such a configuration, the magnetic head can retract into the rotary cylinder, so as to alleviate the impact force, thereby preventing the magnetic head from being damaged.

The rotary head in accordance with this aspect of the present invention may be configured such that the magnetic head moves toward the inside of the rotary cylinder due to an airflow generated between the magnetic head and magnetic tape.

When an airflow is generated due to the transportation of the magnetic tape and a rotation of the rotary cylinder in such a configuration, the airflow lowers the contact force between the magnetic head and magnetic tape, which can prevent the magnetic head from being damaged.

Preferably, in the rotary head in accordance with this aspect of the present invention, the magnetic head is swingably supported by an arm disposed within the rotary cylinder.

Providing an arm swingably supporting the magnetic head as such can easily move the magnetic head toward the inside of the rotary cylinder. If such an arm is flexible, it can swing the magnetic head in a simple configuration.

In such a configuration, the rotary cylinder may be formed with an opening, whereas at least apart of the magnetic head may project from the opening to a periphery of the rotary cylinder.

The rotary head equipped with the above-mentioned arm may be configured such that the magnetic head is attached to a predetermined support, a surface opposed to the magnetic tape in the support is provided with a head projection controller using a piezoelectric material, and the magnetic head is moved toward the inside of the rotary cylinder by the head projection controller.

When the piezoelectric material of the head projection controller is displaced so as to deflect the support, the magnetic head can easily be moved toward the inside of the rotary cylinder. In this case, the surface opposed to the magnetic tape in the support may be provided with the head projection controller.

The rotary head equipped with the above-mentioned arm may be configured such that the magnetic head is attached to a predetermined support, a head projection controller using a piezoelectric material is provided between the support and the arm, and the magnetic head is moved toward the inside of the rotary cylinder by the head projection controller.

When the piezoelectric material of the head projection controller is displaced so as to deflect the support, the magnetic head can easily be moved toward the inside of the rotary cylinder. Also, providing the head projection controller between the support and arm can prevent the head projection controller from being damaged upon contact with the magnetic tape.

Preferably, in the rotary head in accordance with this aspect of the present invention, the magnetic head is moved toward the inside of the rotary cylinder by a head projection controller using a piezoelectric material. When the piezoelectric material of the head projection controller is displaced so as to deflect the support, the magnetic head can easily be moved toward the inside of the rotary cylinder.

Preferably, in each of the rotary heads utilizing a head projection controller, the voltage value applied to the piezoelectric material of the head projection controller is adjusted according to the magnitude of output of information read out from the magnetic tape by the magnetic head.

This aspect of the present invention utilizes a phenomenon that the readout output of a magnetic head increases and decreases as the distance between the magnetic head and a magnetic tape becomes shorter and longer, respectively. When the output of information read out from the magnetic tape is high, the magnetic head may be damaged due to the friction and shock between the magnetic tape and magnetic head. In such a case, the voltage value applied to the piezoelectric material is raised so as to increase the amount of displacement of the magnetic head, whereby the magnetic head moves away from the magnetic head and thus can be prevented from being damaged.

In the rotary head in accordance with this aspect of the present invention, the magnetic head may include a magnetoresistive device for reading information of the magnetic tape by using a magnetoresistive effect.

When the magnetoresistive device is worn, the depth (so-called MR height) of the device from its surface opposed to the magnetic tape changes as mentioned above, thereby altering a characteristic of the magnetic head. Therefore, even when a force directed to the rotary cylinder is applied to the magnetic tape, the magnetic head is moved toward the inside of the rotary cylinder in this aspect of the present invention, whereby the magnetoresistive device is prevented from receiving too much shock from or friction with the magnetic tape, and the magnetic head can be kept from deteriorating its readout characteristic.

The magnetic head may be an inductive magnetic head. Though the inductive magnetic head is supposed to have a surface to be worn by friction with a magnetic tape in general in such a configuration, it is made movable toward the inside of the rotary cylinder, whereby it can be prevented from receiving too much shock from or friction with the magnetic tape.

The present invention provides a magnetic recording/reproducing apparatus comprising any of the above-mentioned rotary heads, and a transport mechanism for transporting a magnetic tape about the rotary head. Since the rotary head is configured such that the contact state between the magnetic head and magnetic tape is appropriately regulated as mentioned above, the magnetic recording/reproducing apparatus equipped with the rotary head is suitable for high-density recording and high transfer rate.

BRIEF DESCRIPTION OF THE DRAWINGS

The present invention may be more readily described with reference to the accompanying drawings, in which.

DESCRIPTION OF THE PREFERRED EMBODIMENTS

In the following, with reference to the accompanying drawings, preferred embodiments of the rotary head and magnetic recording/reproducing apparatus in accordance with the present invention will be explained in detail. Here, constituents identical to each other will be referred to with numerals identical to each other without repeating their overlapping explanations.

First Embodiment

Figure 1:
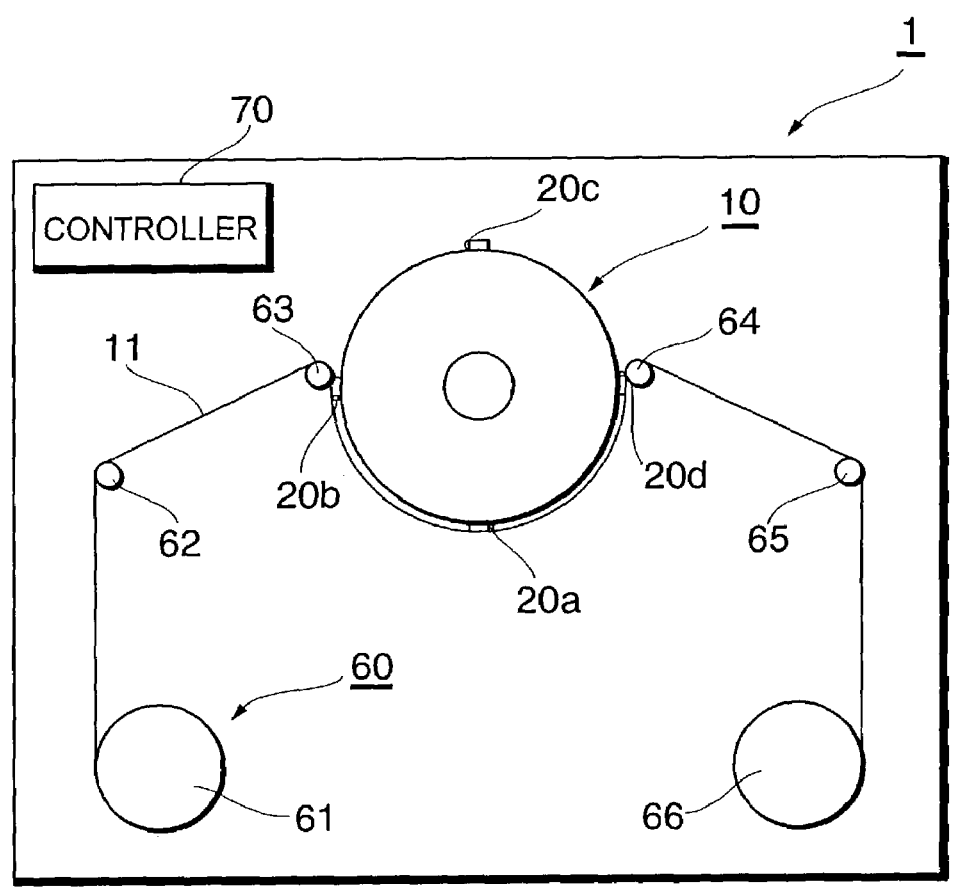
FIG. 1 is a schematic view of an embodiment of the magnetic recording/reproducing apparatus in accordance with the present invention.

FIG. 1 is a schematic view showing a magnetic recording/reproducing apparatus 1 in accordance with a first embodiment. The magnetic recording/reproducing apparatus 1 carries out recording or reading of information on a magnetic tape 11 acting as a recording medium. Examples of the magnetic recording/reproducing apparatus 1 include data storage devices for server backup, Handycam cameras, video decks, and audio decks. The magnetic recording/reproducing apparatus 1 comprises a rotary head 10 mounted with a plurality of magnetic heads 20a to 20d; a transport mechanism 60 for transporting the magnetic tape 11 about the rotary head 10; and a controller 70 for supervising operations of the whole apparatus.

The transport mechanism 60 comprises, successively from the upstream side in the traveling direction of the magnetic tape 11; a feed reel 61 for supplying the magnetic tape 11 toward the rotary head 10; a guide roller 62; guide rollers 63, 64 disposed at positions where the magnetic tape 11 is wound about the rotary head 10; a guide roller 65; and a take-up reel 66 for taking up the magnetic tape 11.

The controller 70 executes various known functions carried out in the magnetic recording/reproducing apparatus 1 in addition to adjusting the timing between the driving of each roller in the transport mechanism 60 and the rotation of the rotary head 10, ordering the magnetic heads of the rotary head 10 to record and read information, and signal-processing the information read out by the magnetic head.

Figure 2:
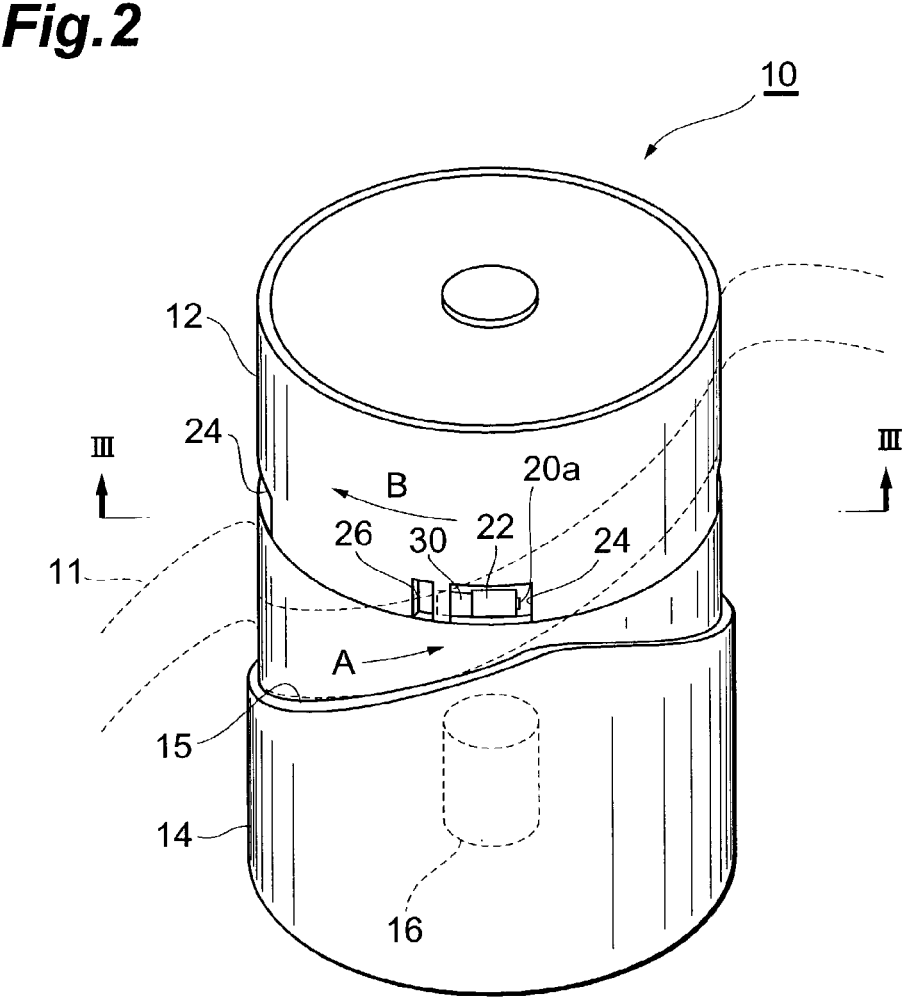
FIG. 2 is a perspective view of a first embodiment of the rotary head in accordance with the present invention.

FIG. 2 is a perspective view of the rotary head 10. The rotary head 10 is adapted to so-called helical scanning. The rotary head 10 mainly comprises a tubular rotary cylinder 12; a stationary cylinder 14 positioned coaxially there under; and a driving motor 16, disposed within the stationary cylinder 14, for rotating the rotary cylinder 12. Though this embodiment relates to a rotary head of a type in which the rotary cylinder 12 is positioned on the stationary cylinder 14, the form of each cylinder is not restricted thereto.

At the time of recording/reproducing information with respect to the magnetic tape 11, the stationary cylinder 14 is kept still without rotating. A tape guide 15 defined by a step is formed about the stationary cylinder 14. At the time of recording/reproducing, the magnetic tape 11 travels along the tape guide 15 in the direction of arrow A in the drawing. Here, the rotary cylinder 12 is rotated at a predetermined rotational speed by the driving motor 16 in the direction of arrow B.

Figure 3:
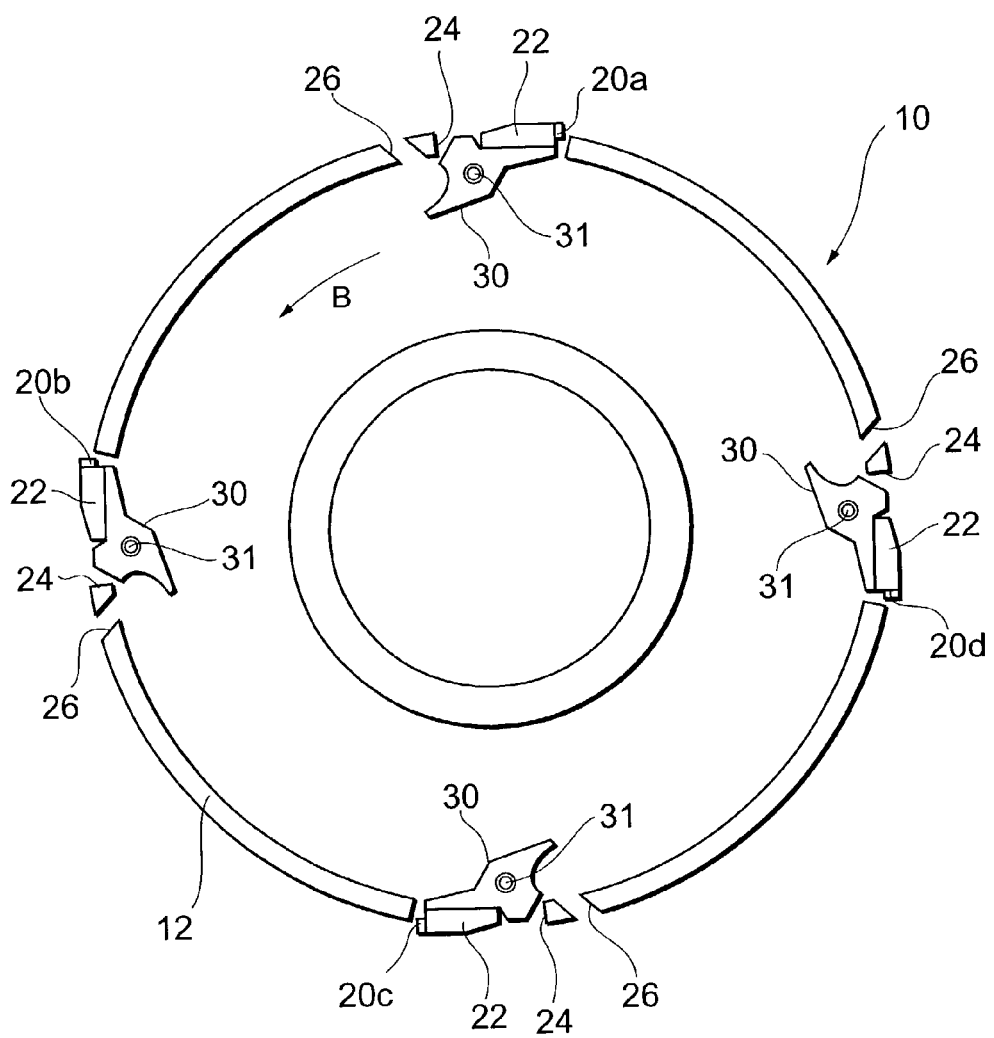
FIG. 3 is a view of the rotary head taken in the direction III—III of FIG. 2.
Figure 4:
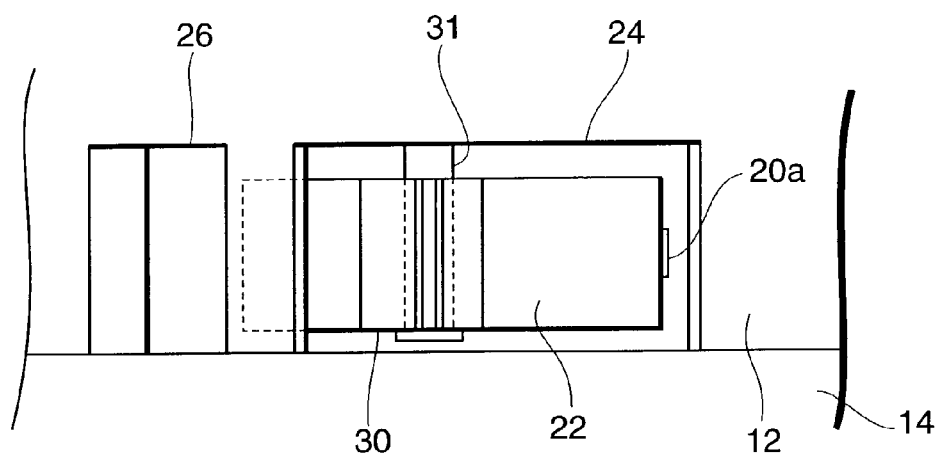
FIG. 4 is a side view of an MR head and its vicinity in the rotary head shown in FIG. 2.

Referring to FIGS. 3 and 4, the rotary head 10 will now be explained in more detail. FIG. 3 is a view of the rotary cylinder 12 taken in the direction III—III of FIG. 2, whereas FIG. 4 is an enlarged view of one magnetic head 20a provided in the rotary head 10 and its vicinity. The rotary head 10 is provided with two write-only inductive magnetic heads 20b, 20d and two read-only magnetoresistive magnetic heads (hereinafter also referred to as "MR heads") 20a, 20c which are alternately disposed along its circumference, though the arrangement of the magnetic heads 20a to 20d is not restricted thereto. The magnetic heads 20a to 20d are attached to their corresponding supports 22 each having a substantially rectangular parallelepiped shape formed from AlTiC ($Al_2O_3 \cdot TiC$), for example.

Employable as the inductive magnetic heads 20b, 20d are known ones, e.g., those comprising a pair of magnetic poles sandwiching a magnetic gap therebetween and a copper coil wound thereabout. When a high-frequency current is caused to flow through the coil, so as to generate a magnetic field, information can be recorded on the magnetic tape 11. The inductive magnetic heads 20b, 20d are attached to their supports 22 such that their information recording surfaces are opposed to the magnetic tape 11 being transported.

The MR heads 20a, 20c utilize a so-called magnetoresistive effect. Specifically, they include AMR (Anisotropic MagnetoResistive) devices utilizing an anisotropic magnetoresistive effect, GMR (Giant MagnetoResistive) devices utilizing a giant magnetoresistive effect, TMR (Tunnel-type MagnetoResistive) devices utilizing a magnetoresistive effect occurring in a tunnel junction, and the like. An MR head can reproduce information at a sensitivity higher than that of an inductive magnetic head. The MR heads 20a, 20c are attached to their supports 22 such that their information recording surfaces are opposed to the magnetic tape 11 being transported.

Though not depicted, the rotary head 10 is provided with wires for transmitting recording information to the inductive magnetic heads 20b, 20d, and wires for transmitting the information read out by the MR heads 20a, 20c. These wires may be connected to the controller 70 shown in FIG. 1 or to a controller or the like separately provided within the stationary cylinder 14.

Each of the supports 22 having their corresponding magnetic heads 20a to 20d attached thereto is provided on one end side of an arm 30 disposed within the rotary cylinder 12. The arm 30 is axially supported at its center part by a swing shaft 31, which vertically rises from the bottom face of the rotary cylinder 12, so as to be swingable about the swing shaft 31. As a consequence, the magnetic heads 20a to 20d are supported so as to be movable toward the inside or outside of the rotary cylinder 12.

The rim of the rotary cylinder 12 is formed with four openings 24 at intervals of 90 degrees, whereby the magnetic heads 20a to 20d can face the magnetic tape 11 through the respective openings 24. Though each opening 24 is formed like a cutout, it may be a hole penetrating through the circumference of the rotary cylinder 12.

Openings 26 are formed at respective positions ahead of their corresponding openings 24 (magnetic heads 20a to 20d) in the rotating direction of the rotary cylinder 12. Through the openings 26, airflows generated by the rotation of the rotary cylinder 12 are led into the rotary cylinder 12. The openings 26 are set at positions where the airflows led into the rotary cylinder 12 through the openings 26 act on the arms 30 on their other end side.

Figure 5:
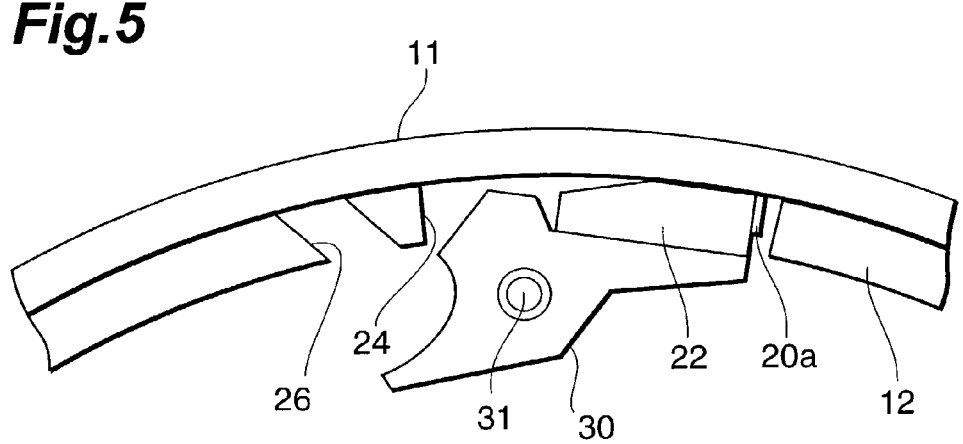
FIG. 5 is an enlarged view of the MR head and its vicinity.
Figure 6:
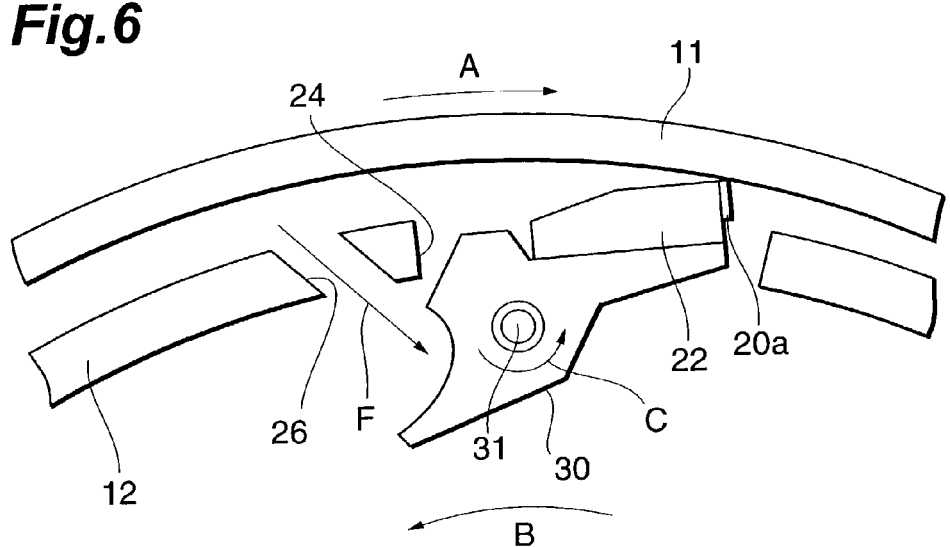
FIG. 6 is an enlarged view of the MR head and its vicinity.

Operations of the rotary head and magnetic recording/reproducing apparatus in accordance with this embodiment will now be explained. The case wherein formation is reproduced by the magnetic recording/reproducing apparatus will be represented by way of example. In response to an order to reproduce, the controller 70 starts rotating the feed reel 61, the take-up reel 66, and the rotary cylinder 12 of the rotary head 10. When the rotary cylinder 12 is stopped, in each of the magnetic heads 20a to 20d, the support 22 and magnetic head 20a to 20d do not project from the outer peripheral face of the rotary cylinder 12 as shown in FIG. 5. When the controller 70 starts rotating the rotary cylinder 12, an airflow F led into the rotary cylinder 12 through the opening 26 occurs as shown in FIG. 6 due to the rotation of the rotary cylinder 12. This airflow F swings the arm 30 in the direction of arrow C, thereby moving the support 22 and magnetic head 20a to 20d toward the outside of the rotary cylinder 12 (see FIG. 6).

Since the magnetic heads 20a to 20d are supported so as to be movable toward the outside of the rotary cylinder 12 as in the foregoing, this embodiment can appropriately regulate the contact state between the magnetic heads 20a to 20d and the magnetic tape 11.

The magnetic heads 20a to 20d are swingably supported by the respective arms 30 disposed within the rotary cylinder 12. Since the arms 30 swingably supporting the magnetic heads 20a to 20d are provided as such, the magnetic heads 20a to 20d can easily be moved toward the outside of the rotary cylinder 12.

Each of the magnetic heads 20a to 20d is disposed on one end side of its corresponding arm 30, and is moved toward the outside of the rotary cylinder 12 when an airflow generated by the rotation of the rotary cylinder 12 acts on the other end side of the arm 30. As a consequence, a configuration which can move the magnetic heads 20a to 20d toward the outside of the rotary cylinder 12 can be realized simply at a low cost.

The rotary cylinder 12 is formed with the openings 26, disposed at positions ahead of their corresponding former openings 24 (magnetic heads 20a to 20d) in the rotating direction of the rotary cylinder 12, for leading the above-mentioned airflow to the inside. As a consequence, the airflow generated by the rotation of the rotary cylinder 12 can reliably be led into the rotary cylinder 12, so as to act on the other end side of the arms 30.

In particular, modifying the shape of openings 26 changes the magnitude of airflow led into the rotary cylinder 12, thereby altering the force acting on the other end side of the arms 30. When the form of openings 26 is set appropriately as such, the contact state between the magnetic heads 20a to 20d and the magnetic tape 11 can be adjusted more suitably.

As mentioned above, the rotary head 10 utilizes the MR heads 20a, 20c as magnetic heads for reproduction. The MR heads are advantageous in that their sensitivity is higher than that of inductive magnetic heads. However, it is unfavorable for the MR heads to have their surfaces worn by friction with a magnetic tape like the inductive magnetic heads. If a magnetoresistive device is worn in particular, the depth (so-called MR height) of the device from its surface opposed to the magnetic tape will change, thereby altering characteristics of the magnetic head. If the magnetic head and the magnetic tape are separated from each other, the output sensitivity will decrease greatly, thereby deteriorating the output characteristic. Namely, it is more important for the MR heads than the inductive magnetic heads to adjust their contact state with respect to the magnetic tape appropriately. Therefore, this embodiment is effective in the inductive magnetic heads 20b, 20d and more in the MR heads 20a, 20c. That is, this embodiment can appropriately adjust the contact state between the MR heads 20a, 20c and the magnetic tape 11, thereby preventing the MR heads 20a, 20c from receiving too much shock or friction while keeping them from deteriorating their output characteristics.

Second Embodiment

With reference to FIGS. 7 to 10, a second embodiment of the present invention will now be explained. As for the magnetic recording/reproducing apparatus, one similar to that of FIG. 1 can be employed.

Figure 7:
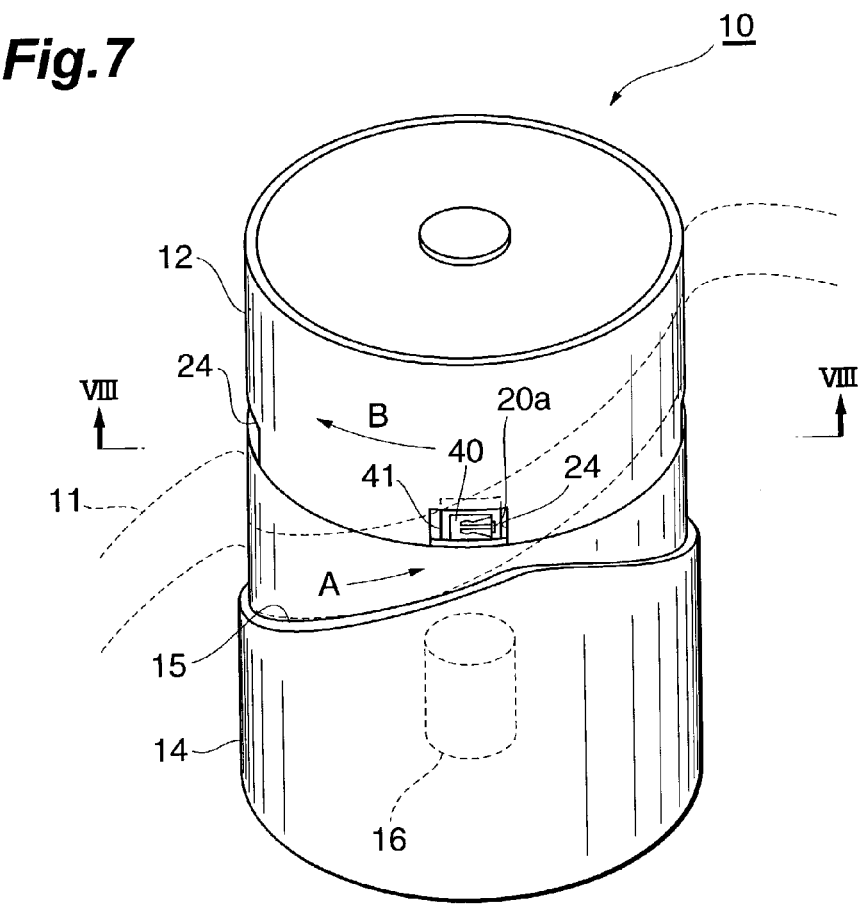
FIG. 7 is a perspective view of a second embodiment of the rotary head in accordance with the present invention.
Figure 8:
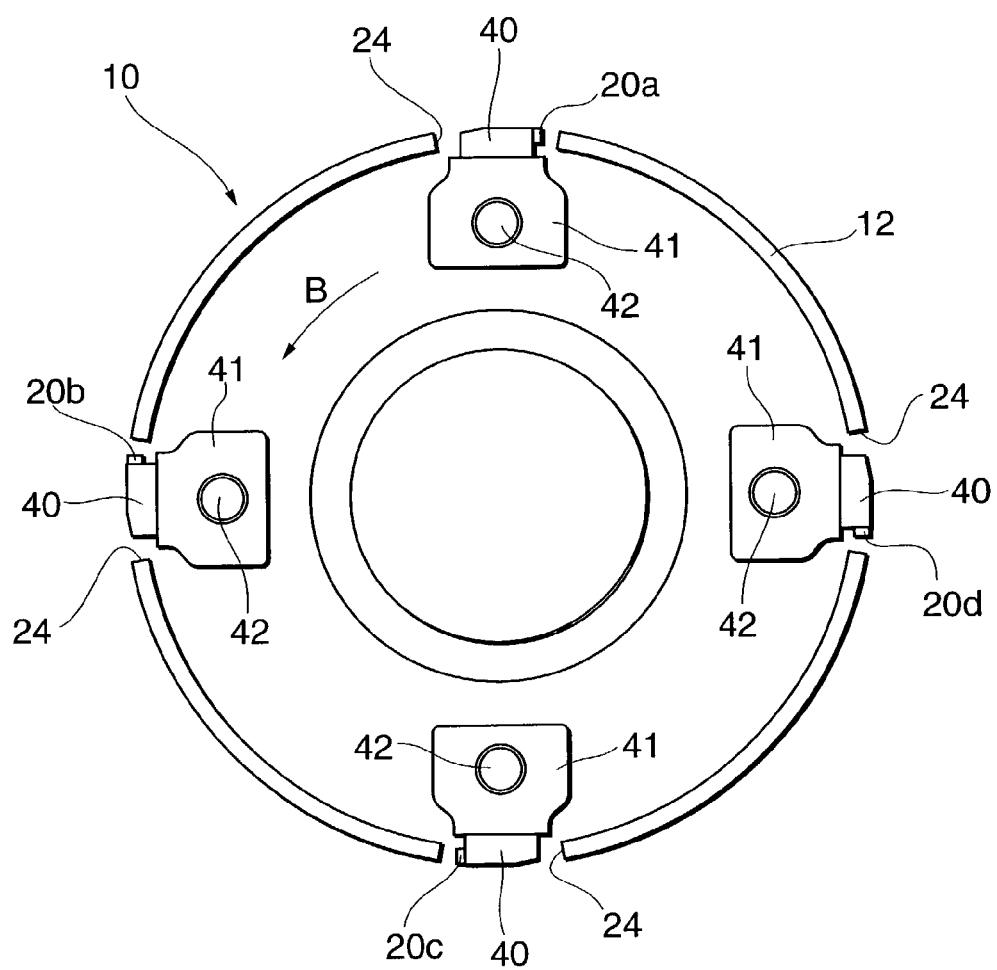
FIG. 8 is a view of the rotary head taken in the direction VIII—VIII of FIG. 7.

FIG. 7 is a perspective view of a rotary head 10 in accordance with this embodiment. FIG. 8 is a view of a rotary cylinder 12 taken in the direction VIII—VIII of FIG. 7. Magnetic heads 20a to 20d are attached to their corresponding supports 40 each having a substantially rectangular parallelepiped shape formed from AlTiC ($Al_2O_3$.TiC), for example. The supports 40 having the respective magnetic heads 20a to 20d attached thereto are secured to their corresponding support members 41 disposed within the rotary cylinder 12. Each support member 41 is secured at its center part to a shaft 42 vertically rising from the bottom face of the rotary cylinder 12. As a consequence, the magnetic heads 20a to 20d themselves are kept from moving toward the inside or outside of the rotary cylinder 12.

Figure 9:
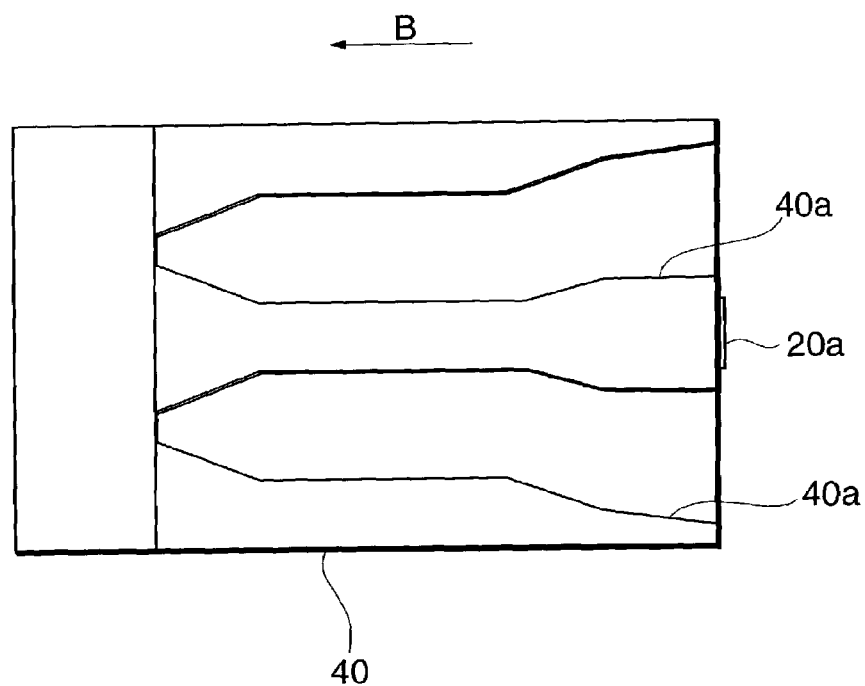
FIG. 9 is a plan view of a support in the rotary head shown in FIG. 7.

Each support 40 is formed with grooves 40a at its surface opposed to the magnetic tape 11 such that a negative pressure (state with a pressure lower than the atmospheric pressure) is generated between the surface opposed to the magnetic tape 11 and the magnetic tape 11 by an airflow caused by the traveling of the magnetic tape 11 and the rotation of the rotary cylinder 12 (see FIG. 9). The grooves 40a function as gap adjusting means for adjusting the gap between the magnetic heads 20a to 20d and the magnetic tape 11 by using airflows generated between the magnetic heads 20a to 20d and the magnetic tape 11.

Figure 10:
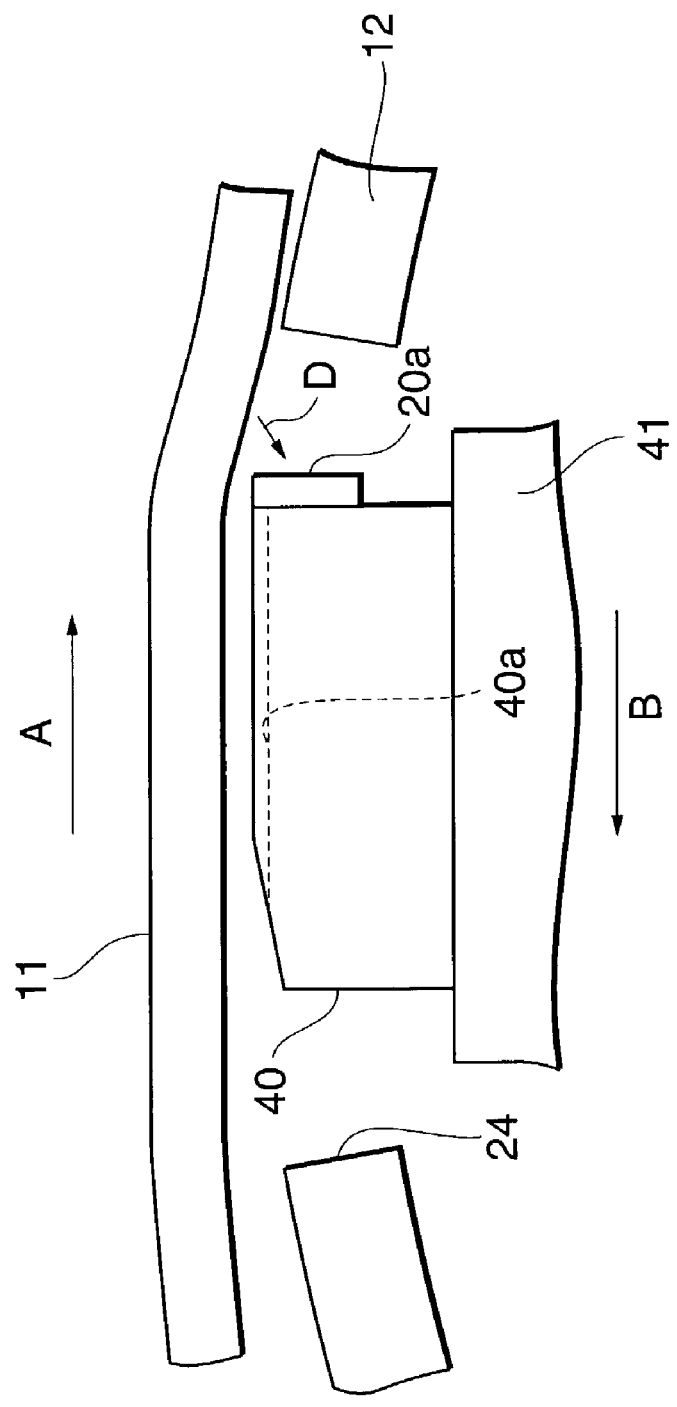
FIG. 10 is an enlarged view of an MR head and its vicinity.

Operations of the rotary head and magnetic recording/reproducing apparatus in accordance with this embodiment will now be explained. The case where information is reproduced by the magnetic recording/reproducing apparatus will be represented by way of example. In response to an order to reproduce, the controller 70 starts rotating the feed reel 61, the take-up reel 66, and the rotary cylinder 12 of the rotary head 10. Then, the traveling of the magnetic tape 11 and the rotation of the rotary cylinder 12 generate an airflow therebetween, there by yielding a negative pressure state between the surface of support 40 opposed to the magnetic tape 11 and the magnetic tape 11. Thus generated negative pressure acts on the magnetic tape 11, thereby moving the magnetic tape 11 toward magnetic heads 20a to 20d (in the direction of arrow D) as shown in FIG. 10. This adjusts the gap between the magnetic heads 20a to 20d and the magnetic tape 11.

Since the surface of support 40 opposed to the magnetic tape 11 is formed with the grooves 40a such that the airflow caused by the traveling of the magnetic tape 11 and the rotation of the rotary cylinder 12 generates a negative pressure between the surface opposed to the magnetic tape 11 and the magnetic tape 11, this embodiment can adjust the contact state between the magnetic heads 20a to 20d and the magnetic tape 11 in a direction in which the magnetic tape 11 approaches the magnetic heads 20a to 20d. Since the grooves 40a adjust the gap between the magnetic heads 20a to 20d and the magnetic tape 11 as such, the contact state between the magnetic heads 20a to 20d and the magnetic tape 11 can be regulated appropriately.

In particular, modifying the shape of grooves 40a changes the magnitude of airflow generated by the traveling of the magnetic tape 11 and the rotation of the rotary cylinder 12, thereby altering the magnitude of negative pressure occurring between the surface opposed to the magnetic tape 11 and the magnetic tape 11. When the form of grooves 40a is set appropriately as such, the contact state between the magnetic heads 20a to 20d and the magnetic tape 11 can be adjusted more suitably.

Figure 11:
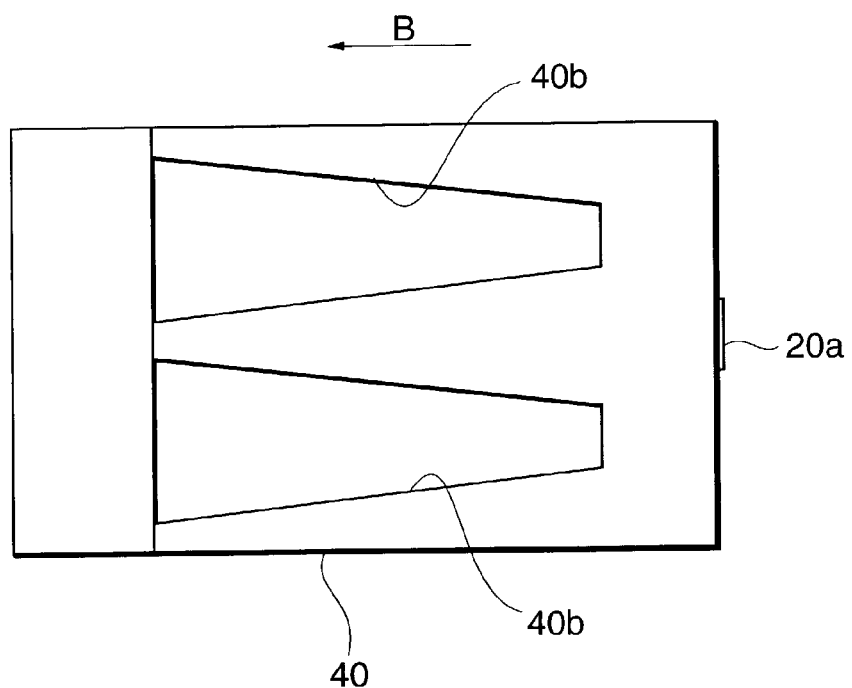
FIG. 11 is a plan view of a support in a modified example of the second embodiment of the rotary head in accordance with the present invention.
Figure 12:
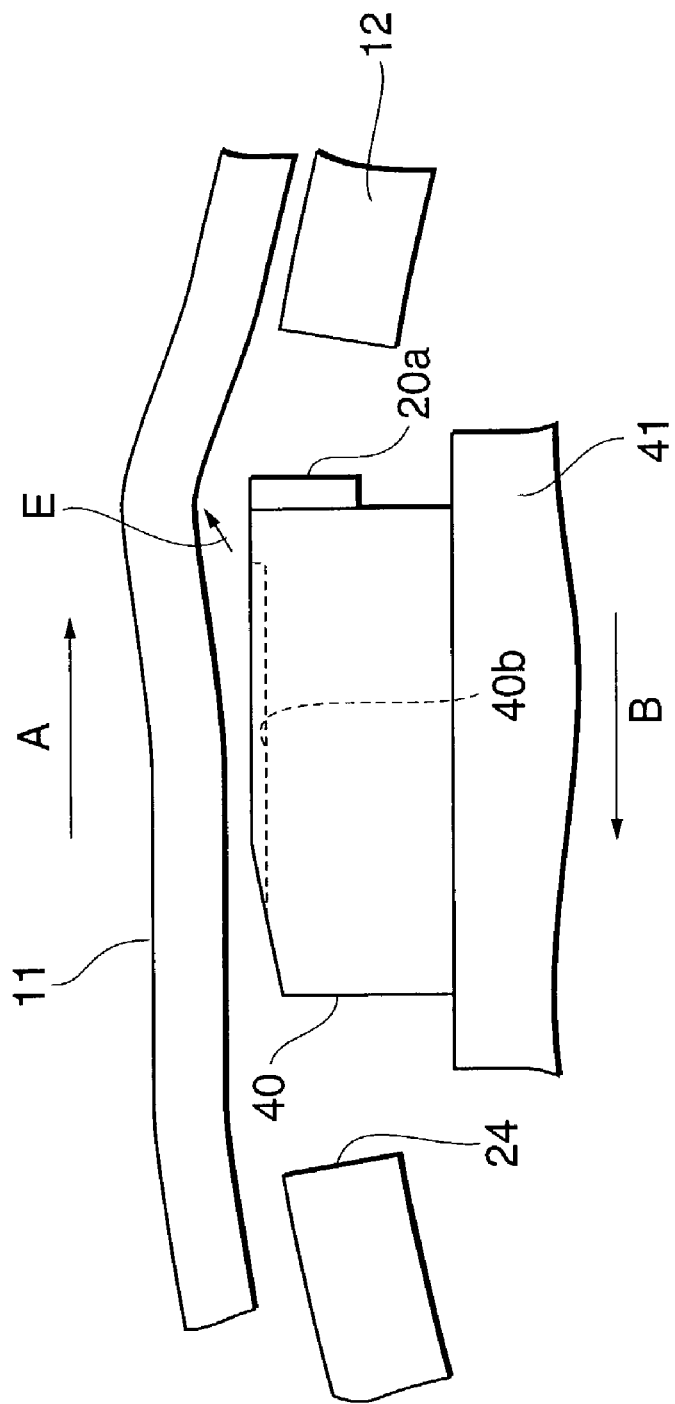
FIG. 12 is an enlarged view of an MR head and its vicinity.

With reference to FIGS. 11 and 12, a modified example of this embodiment will now be explained. This example differs from the mode shown in FIGS. 7 to 10 in the shape of grooves formed in the support 40.

In this example, grooves 40b are formed in the surface opposed to the magnetic tape 11 such that an airflow caused by the traveling of the magnetic tape 11 and the rotation of the rotary cylinder 12 generates a positive pressure (state with a pressure higher than the atmospheric pressure) between the surface opposed to the magnetic tape 11 and the magnetic tape 11 (see FIG. 11). As with the grooves 40a, the grooves 40b function as gap adjusting means for adjusting the gap between the magnetic heads 20a to 20d and the magnetic tape 11 by using the airflow generated between the magnetic heads 20a to 20d and the magnetic tape 11.

Operations of the rotary head and magnetic recording/reproducing apparatus in this example will now be explained. The case where information is reproduced by the magnetic recording/reproducing apparatus will be represented by way of example. In response to an order to reproduce, the controller 70 starts rotating the feed reel 61, the take-up reel 66, and the rotary cylinder 12 of the rotary head 10. Then, the traveling of the magnetic tape 11 and the rotation of the rotary cylinder 12 generate an airflow therebetween, thereby yielding a positive pressure state between the surface of support 40 opposed to the magnetic tape 11 and the magnetic tape 11. Thus generated positive pressure acts on the magnetic tape 11, thereby moving the magnetic tape 11 away from the magnetic heads 20a to 20d (in the direction of arrow E) as shown in FIG. 12. This adjusts the gap between the magnetic heads 20a to 20d and the magnetic tape 11.

Since the surface of support 40 opposed to the magnetic tape 11 is formed with the grooves 40b such that the airflow caused by the traveling of the magnetic tape 11 and the rotation of the rotary cylinder 12 generates a positive pressure between the surface opposed to the magnetic tape 11 and the magnetic tape 11, this example can adjust the contact state between the magnetic heads 20a to 20d and the magnetic tape 11 in a direction in which the magnetic tape 11 moves away from the magnetic heads 20a to 20d. Since the grooves 40b adjust the gap between the magnetic heads 20a to 20d and the magnetic tape 11 as such, the contact state between the magnetic heads 20a to 20d and the magnetic tape 11 can be regulated appropriately.

In particular, modifying the shape of grooves 40b changes the magnitude of airflow generated by the traveling of the magnetic tape 11 and the rotation of the rotary cylinder 12, thereby altering the magnitude of positive pressure occurring between the surface opposed to the magnetic tape 11 and the magnetic tape 11. When the form of grooves 40b is set appropriately as such, the contact state between the magnetic heads 20a to 20d and the magnetic tape 11 can be adjusted more suitably.

Figure 13:
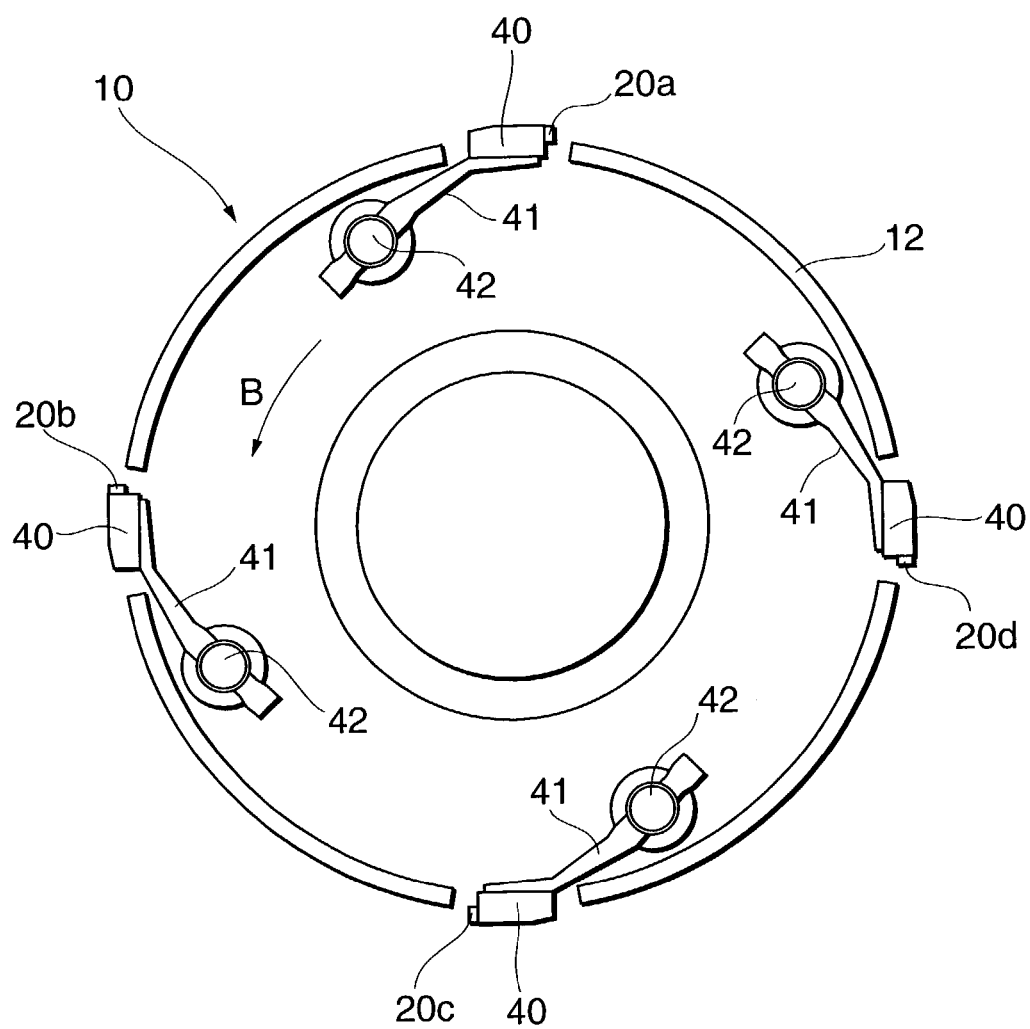
FIG. 13 is a view for explaining a modified example of the second embodiment of the rotary head in accordance with the present invention.

FIG. 13 is a view showing a modified example of the second embodiment. In this example, unlike FIGS. 8 and 12, support members 41 are formed like arms. In this case, each of the magnetic heads 20a to 20d is attached to one end side of its corresponding support member 41, whereas the other end side of the support member 41 is secured to a shaft 42.

Third Embodiment

Figure 14:
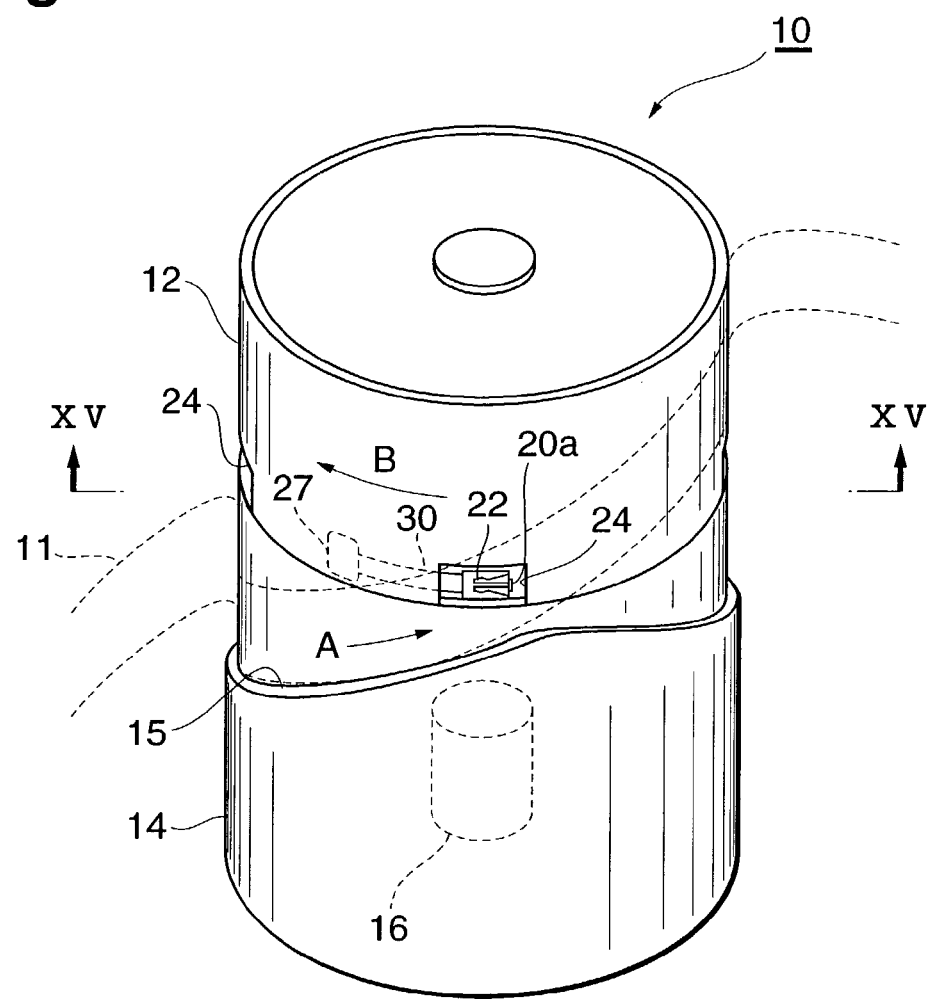
FIG. 14 is a perspective view of a third embodiment of the rotary head in accordance with the present invention.
Figure 15:
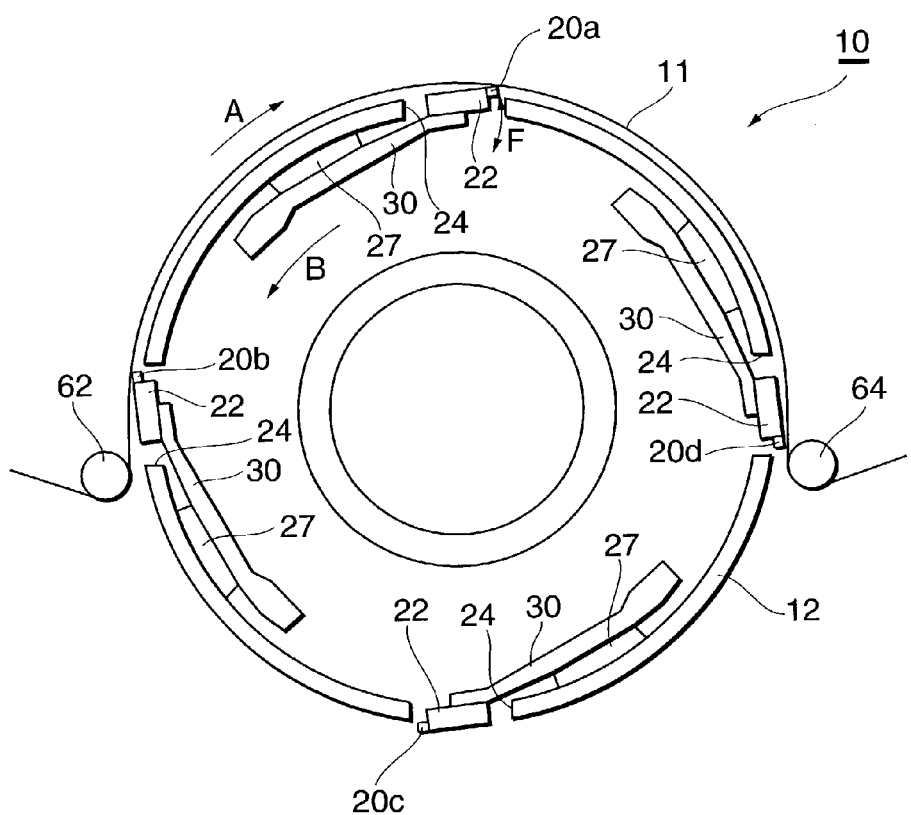
FIG. 15 is a view of the rotary head taken in the direction XV—XV of FIG. 14.
Figure 16:
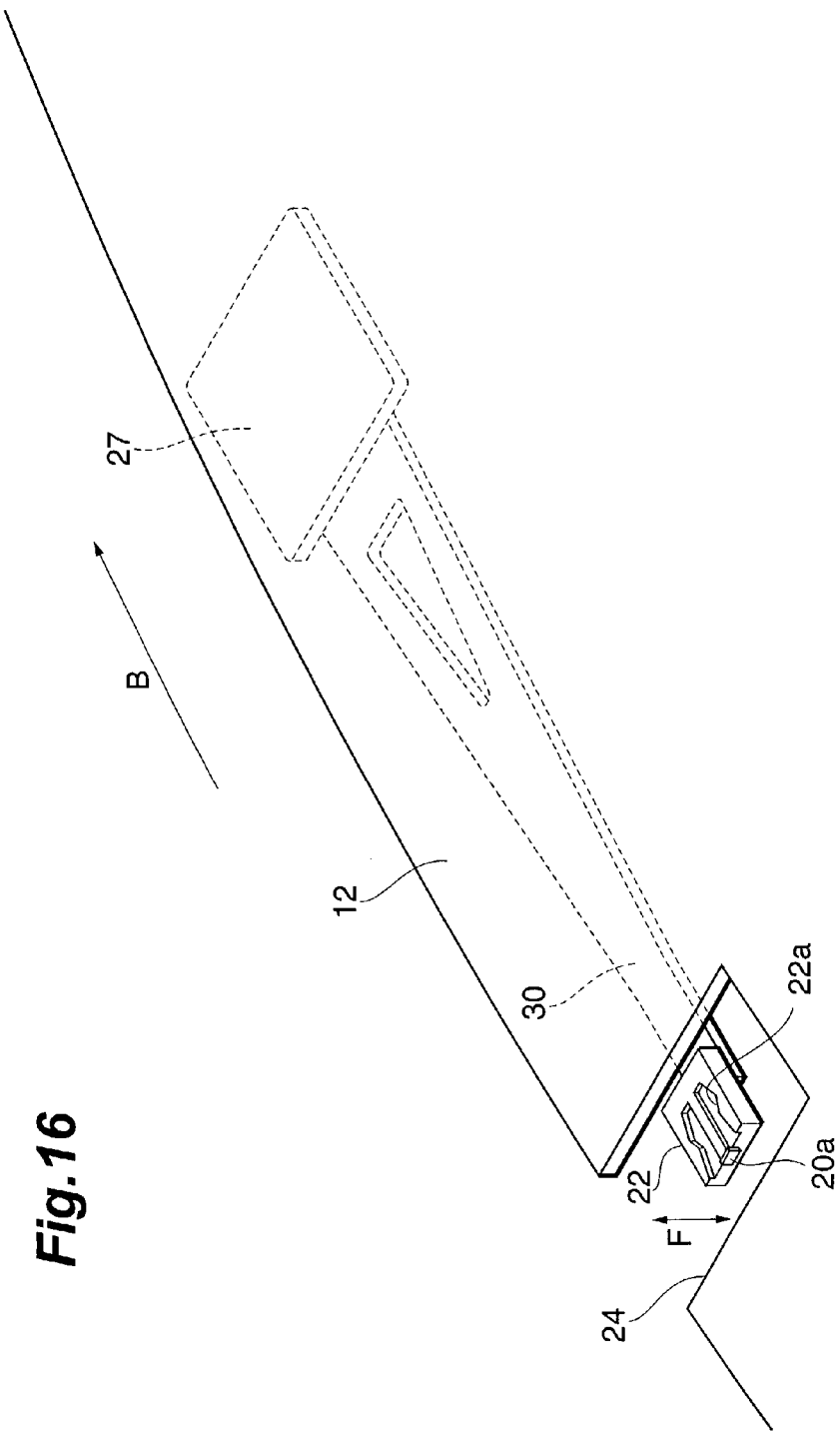
FIG. 16 is an enlarged view of an MR head and its vicinity.

FIG. 14 is a perspective view of a rotary head 10 in accordance with a third embodiment. FIG. 15 is a view of a rotary cylinder 12 taken in the direction XV—XV of FIG. 14. FIG. 16 is an enlarged view of one magnetic head 20a provided in the rotary head 10 and its vicinity. The rotary head 10 is provided with two inductive magnetic heads 20b, 20d and two read-only magnetoresistive magnetic heads 20a, 20c which are alternately disposed along its circumference, though the arrangement of the magnetic heads 20a to 20d is not restricted thereto.

Supports 22 having the respective magnetic heads 20a to 20d attached thereto are supported by their corresponding suspension arms 30 made of a stainless steel such as SUS304, for example. The suspension arms 30 are supported by their corresponding support tables 27 attached to the inner periphery of the rotary cylinder 12. The suspension arms 30 have a flexibility, and support the magnetic heads 20a to 20d such that the latter are swingable in the directions of arrows F. More specifically, the selection of material of suspension arms 30, their load setting, adjustment of their form of suspension, and the like are carried out such that the pressure caused by a certain shock received from the traveling magnetic tape 11 or the airflow caused by the traveling of the magnetic tape 11 and the rotation of the rotary cylinder 12 moves the magnetic heads 20a to 20d toward the inside of the rotary cylinder 12. Each support 22 is formed with grooves 22a at its surface opposed to the magnetic tape 11, so as to make it easier for the airflow to adjust the contact force between the magnetic heads and the magnetic tape 11 (see FIG. 16). As such a suspension arm 30, one utilized in a hard disk apparatus is also employable.

The rim of the rotary cylinder 12 is formed with four openings 24 at intervals of 90 degrees, whereby the magnetic heads 20a to 20d can face the magnetic tape 11 through their corresponding openings 24. Though each opening 24 is formed like a cutout, it may be a hole penetrating through the circumference of the rotary cylinder 12. Preferably, the inclination of suspension arms 30 and their suspension strength are adjusted such that the information recording surfaces of the inductive magnetic heads 20b, 20d and the information reading surfaces of the MR heads 20a, 20c project from the outer periphery of the rotary cylinder 12 to some extent in a state where no external force is applied to the arms 30. Then, the magnetic heads 20a to 20d projected from the outer periphery of the rotary cylinder 12 come into contact with the magnetic tape 11 at least when the rotary cylinder 12 is stopped as shown in FIG. 15.

Operations of the rotary head and magnetic recording/reproducing apparatus in accordance with this embodiment will now be explained. The case where information is reproduced by the magnetic recording/reproducing apparatus will be represented by way of example. As the magnetic recording/reproducing apparatus, one shown in FIG. 1 can be employed. In response to an order to reproduce, the controller 70 starts rotating the feed reel 61, the take-up reel 66, and the rotary cylinder 12 of the rotary head 10. Then, the traveling of the magnetic tape 11 and the rotation of the rotary cylinder 12 generate an airflow therebetween. Though the magnetic heads 20a to 20d are firmly in contact with the magnetic tape 11 when the rotary cylinder 12 is stopped (see FIG. 15), the above-mentioned airflow moves the supports 22 and magnetic heads 20a to 20d toward the inside of the rotary cylinder 12. Here, each suspension arm 30 is in a state where its leading end side connected to the support 22 is flexed away from the magnetic tape 11 (toward the center of the rotary cylinder 12 in the direction of one of arrows F in FIG. 15). Since the suspension arms 30 have a flexibility, the supports 22 can easily be moved toward the inside of the rotary cylinder 12.

Retracting the magnetic heads 20a to 20d toward the inside of the rotary cylinder 12 by using the airflow can appropriately regulate the contact state between the magnetic head and magnetic tape. This can prevent the magnetic heads 20a to 20d from receiving too much shock form or friction with the magnetic tape 11. Here, it is not always necessary for the magnetic heads 20a to 20d to retract to the inner space of the rotary cylinder 12. It will be sufficient if they move to such an extent that the contact force with respect to the magnetic tape 11 can be lowered. From the viewpoint of carrying out information recording by the inductive magnetic heads 20b, 20d and information reading by the MR heads 20a, 20c at a high sensitivity, it will be preferred if the magnetic heads 20a to 20d are slightly in contact with the magnetic tape 11 instead of being completely separated from the latter.

The magnetic heads 20a to 20d may receive a certain shock from the magnetic tape 11 in addition to the above-mentioned airflow. When the supports 22 and magnetic heads 20a to 20d receive a shock as such, the suspension arms 30 flex, whereby each magnetic head retracts to the inside of the rotary cylinder. This can alleviate the impact force received by each of the magnetic heads 20a to 20d, thereby preventing the magnetic heads from being damaged.

As mentioned above, the rotary head 10 utilizes the MR heads 20a, 20c as reproducing magnetic heads. When the MR heads are worn, so-called MR height changes, thereby altering characteristics of the magnetic heads. Namely, it is more necessary for the MR heads than the inductive magnetic heads to lower their contact force with respect to the magnetic tape. Therefore, this embodiment is effective in the inductive magnetic heads 20b, 20d and more in the MR heads 20a, 20c. That is, this embodiment can prevent the MR heads 20a, 20c having surfaces which are not supposed to be worn from wearing and restrain their MR height from changing.

Though this embodiment utilizes suspension arms 30 which are likely to flex, the configuration for moving the magnetic heads toward the inside of the rotary cylinder 12 is not restricted thereto. For example, a highly rigid arm may be made rotatable about a predetermined axis, such that a magnetic head is swingable. Further, magnetic heads and supports may be supported with elastic members such as coil springs or other kinds of springs, instead of arms in a cantilever fashion. Namely, any configuration can be employed as long as a magnetic head is supported so as to be movable toward the inside of the rotary cylinder 12 when an external force is applied to a support or the magnetic head. When a configuration in which a magnetic head is swingably supported by an arm in a cantilever fashion as in this embodiment is employed, however, a simple configuration can prevent the magnetic head and the magnetic tape from coming into too much contact with each other.

Fourth Embodiment

Figure 17:
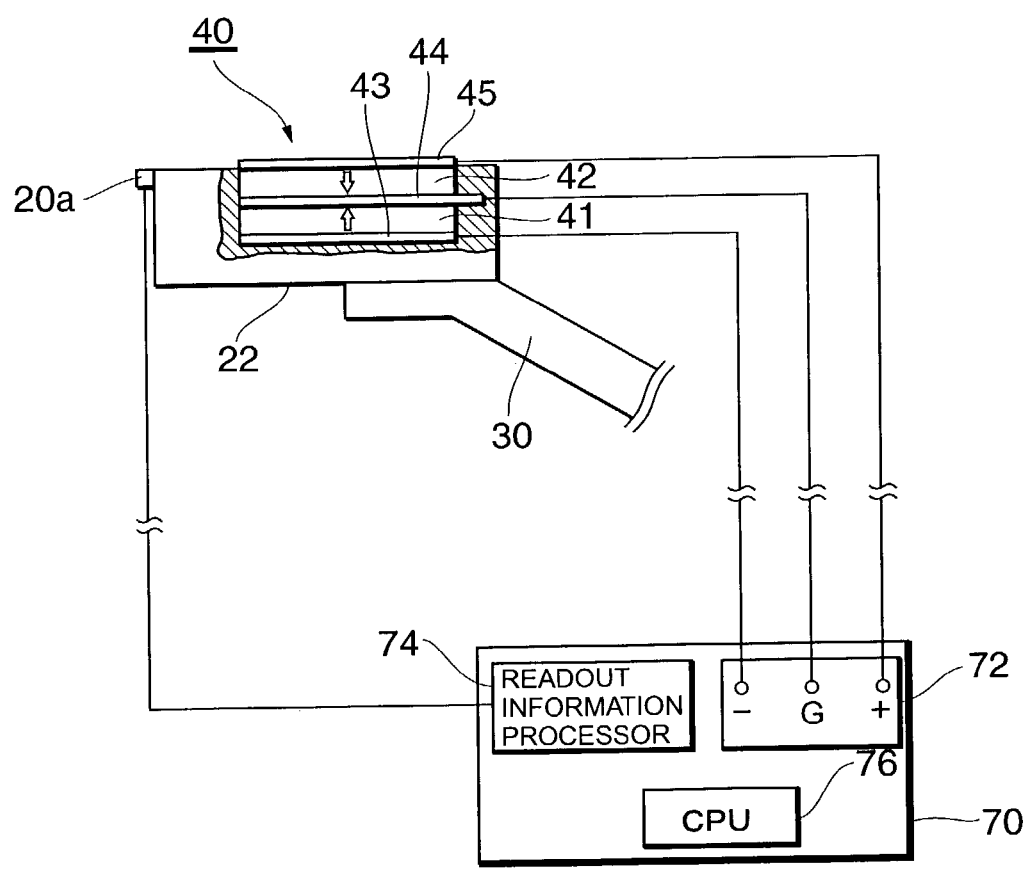
FIG. 17 is a schematic view showing a fourth embodiment of the rotary head in accordance with the present invention.
Figure 18:
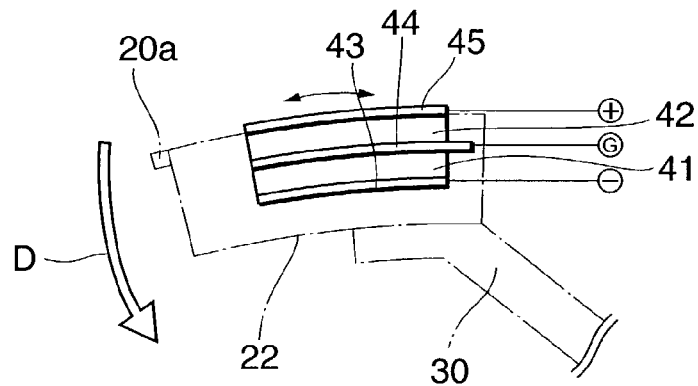
FIG. 18 is a schematic view showing the state where a head projection controller of the rotary head shown in FIG. 17 is displaced.
Figure 19:
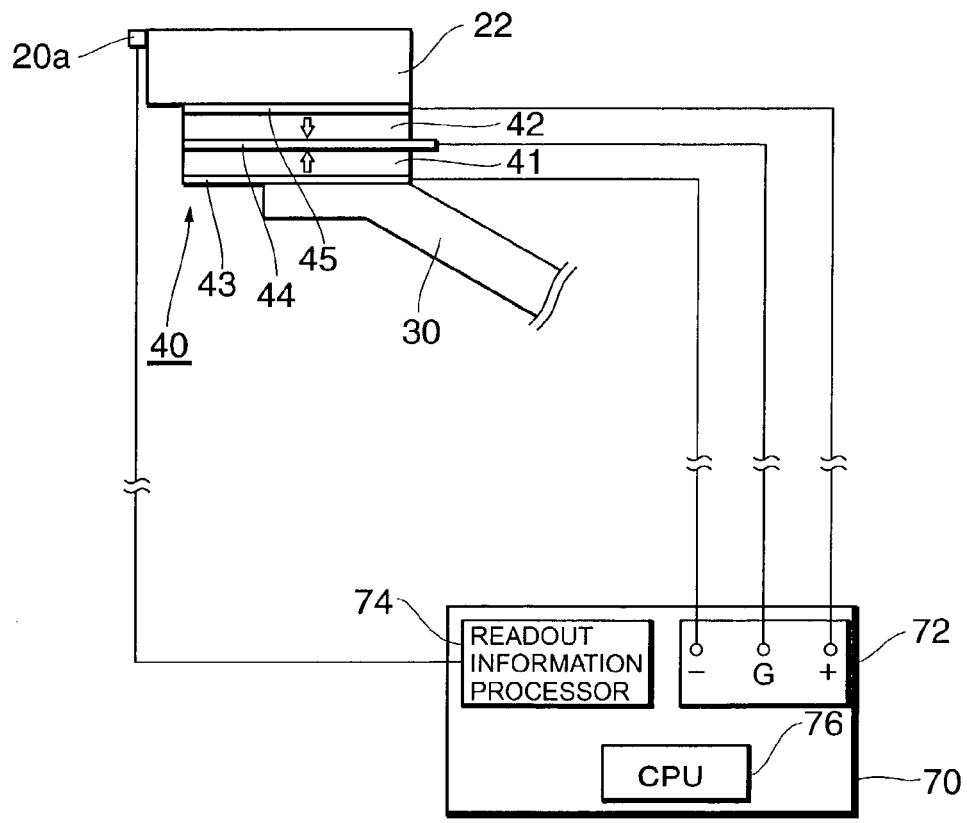
FIG. 19 is a schematic view showing a modified example of the rotary head shown in FIG. 17.

With reference to FIGS. 17 to 19, a fourth embodiment of the present invention will now be explained. This embodiment differs from the third embodiment in that a head projection amount controller using a piezoelectric material is utilized in order to move magnetic heads toward the inside of the rotary cylinder 12. As for the magnetic recording/reproducing apparatus, one similar to that of FIG. 1 can be employed.

FIG. 17 is an enlarged view of an MR head 20a and its vicinity in the rotary head of this embodiment. As depicted, a head projection controller 40 comprising a piezoelectric material is embedded in a support 22 on the upper face side (on the side of the surface opposed to the magnetic tape 11) in the drawing. The head projection controller 40 is of bimorph type which deflects when a voltage is applied thereto, and is provided with two piezoelectric layers 41, 42 utilizing PZT as a piezoelectric material. As indicated by outlined thick arrows in the drawing, the polarizing directions of piezoelectric layers 41 and 42 are upward and downward in the drawing, respectively. Here, while PZT refers to ceramics obtained by mixing lead titanate ($PbTiO_3$)

and lead zirconate ($PbZrO_3$) together, various other known piezoelectric materials can be utilized as well.

An electrode plate 43 is disposed under the piezoelectric layer 41. An electrode plate 44 is disposed between the piezoelectric layers 41 and 42. An electrode plate 45 is disposed on the piezoelectric layer 42. A power supply 72 within a controller 70 applies voltages to the electrode plates 43, 44, 45. Namely, a positive voltage is applied to the topmost electrode plate 45, the center electrode plate 44 is grounded, and a negative voltage is applied to the bottom electrode plate 43.

The controller 70 incorporates therein a readout information processor 74 for processing the information of magnetic tape read out by the MR head 20a, whereas the MR head 20a and the readout information processor 74 are connected to each other by a wire. A CPU 76 supervises the processing of the controller 70, and is set so as to actuate the power supply 72 when the magnitude of information read out by the readout information processor 74 exceeds a predetermined reference value, thereby applying voltages to the head projection controller 40. The reference value maybe stored in the CPU 76, the readout information processor 74, or other memories.

Operations of the rotary head and magnetic recording/reproducing apparatus in this embodiment will now be explained. If the contact force between a magnetic tape and the MR head 20a is too strong during when the MR head 20a reads out information of the magnetic tape, the readout information processor 74 may determine that the magnitude of readout information in the MR head 20a exceeds a predetermined reference value. In such a case, the CPU 76 actuates the power supply 72, so as to apply a positive voltage to the electrode plate 45, ground the electrode plate 44, and apply a negative voltage to the electrode plate 43.

When voltages are applied to the electrode plates 43 to 45 as such, their relationships with the polarizing directions cause the upper piezoelectric layer 42 and the lower piezoelectric layer 41 to expand and shrink sidewise in the drawing, respectively, as shown in FIG. 18. As a result, a support 22 (indicated by broken lines for convenience of explanation) deflects as indicated by arrow G, there by moving the MR head 20a toward the inside of the rotary cylinder, i.e., away from the magnetic tape. Then, by constantly keeping the distance or load from the magnetic tape 11, the MR head 20a can be prevented from being damaged.

Though this embodiment is configured such that the piezoelectric layers 41, 42 of the head projection controller 40 are displaced when the output value of an MR head exceeds a predetermined reference value, voltage values applied to the head projection controller 40 may be adjusted in proportion to the output value of the MR head. Though an MR head is explained hereby way of example, inductive magnetic heads for recording can also be moved by displacement of a head projection controller. When utilizing the head projection controller 40, suspension arms are not always necessary. In this case, it will be sufficient if the magnetic heads 20a to 20d are supported so as to be movable toward the inside of the rotary cylinder upon displacement of the head projection controller 40.

With reference to FIG. 19, a modified example of this embodiment will now be explained. This example differs from the mode shown in FIG. 17 in the location where the head projection controller 40 is placed. In this example, the head projection controller 40 is disposed between the support 22 and the suspension arm 30. The displacement of head projection controller 40 shown in FIG. 18 can move the magnetic heads 20a to 20d toward the inside of the rotary cylinder in the case employing such a configuration as well. This can reduce damages of the magnetic heads which may occur upon too much contact with the magnetic tape. Further, since the head projection controller 40 is disposed between the support 22 and suspension arm 30, this example can prevent the head projection controller 40 from being damaged upon contact with the magnetic tape.

The fourth embodiment uses the piezoelectric material of the head projection controller 40 as means for converting electric energy to mechanical energy. On the other hand, the piezoelectric material generates a voltage when a stress is applied thereto, thus functioning to convert mechanical energy to electric energy. Utilizing the latter converting function, the head projection controller 40 may be arranged in contact with the magnetic tape 11, so that the contact pressure with respect to the magnetic tape 11 can be measured directly. When the arm supporting the magnetic head is moved toward the inside of the rotary cylinder according to thus measured contact pressure, the magnetic head can be restrained from being damaged.

In this case, a first piezoelectric member for measuring the contact pressure may be provided on the side of the surface of support 22 opposed to the magnetic head 11, whereas a second piezoelectric member for moving the magnetic head may be disposed on the opposite side (suspension arm side). In this case, the piezoelectric members can realize operations from the measurement of contact pressure to the movement of magnetic head.

Though the invention achieved by the inventors is specifically explained with reference to embodiments in the foregoing, the invention is not restricted to the above-mentioned embodiments. For example, the magnetic head provided in the rotary head may be a combination head in which a reproducing MR head and a recording inductive magnetic head are integrated.

Also, the surface of support 22 opposed to the magnetic tape 11 in the first embodiment may be formed with the grooves 40a, 40b in the second embodiment.

As explained in the foregoing, the present invention can provide a rotary head which can appropriately adjust the contact state between a magnetic head and a magnetic tape, and a magnetic recording/reproducing apparatus equipped therewith.

The basic Japanese Applications No. 2002-54126 filed on Feb. 28, 2002 and No. 2002-148115 filed on May 22, 2002 are hereby incorporated by reference.

What is claimed is:

1. A rotary head comprising:
   a tubular rotary cylinder; and
   a magnetic head for carrying out at least one of recording and reading of information with respect to a magnetic tape transported about said rotary cylinder;
   wherein said magnetic head is movable toward an outside of said rotary cylinder due to an airflow generated by a rotation of said rotary cylinder.

2. A rotary head according to claim 1, wherein said magnetic head is swingably supported by an arm disposed within said rotary cylinder.

3. A rotary head according to claim 1, wherein said magnetic head is disposed on one end side of an arm and said magnetic head moves toward the outside of said rotary cylinder when said airflow acts on an other end side of said arm.

4. A rotary head according to claim 3, wherein said rotary cylinder is formed with an opening, disposed at a position ahead of said magnetic head in a rotating direction of said rotary cylinder, for introducing said airflow therein.

5. A rotary head according to claim 1, wherein said magnetic head includes a magnetoresistive device for reading information of said magnetic tape by using a magnetoresistive effect.

6. A rotary head according to claim 1, wherein said magnetic head is an inductive magnetic head.

7. A magnetic recording/reproducing apparatus comprising the rotary head according to claim 1, and a transport mechanism for transporting said magnetic tape about said rotary head.

8. A rotary head, comprising:
a tubular rotary cylinder; and
a magnetic head for carrying out at least one of recording and reading of information with respect to a magnetic tape transported about said rotary cylinder;
wherein said magnetic head is movable toward an outside of said rotary cylinder, and
wherein said rotary cylinder is formed with an opening, disposed at a position ahead of said magnetic head in a rotating direction of said rotary cylinder, for introducing an airflow therein.

9. A rotary head, comprising:
a tubular rotary cylinder; and
a magnetic head for carrying out at least one of recording and reading of information with respect to a magnetic tape transported about said rotary cylinder;
wherein said magnetic head is movable toward an outside of said rotary cylinder, said magnetic head is swingably supported by an arm rotatable around a shaft, and said magnetic head is movable toward said outside of said rotary cylinder so that at least a portion of said magnetic head is positioned outside said rotary cylinder.

* * * * *